United States Patent
Hong et al.

(10) Patent No.: US 9,923,986 B2
(45) Date of Patent: Mar. 20, 2018

(54) MASTER TSM

(71) Applicant: Mozido Corfire—Korea, Ltd., Gangnam-daero, Gangnam-gu, Seoul (KR)

(72) Inventors: Jun S. Hong, Atlanta, GA (US); Yong Sung Kwon, Alpharetta, GA (US)

(73) Assignee: Mozido CorFire—Korea, Ltd., Sungnam-Si, Kyunggi-Do (KR)

( * ) Notice: Subject to any disclaimer, the term of this patent is extended or adjusted under 35 U.S.C. 154(b) by 75 days.

(21) Appl. No.: 14/369,945

(22) PCT Filed: Dec. 27, 2012

(86) PCT No.: PCT/KR2012/011582
§ 371 (c)(1),
(2) Date: Jun. 30, 2014

(87) PCT Pub. No.: WO2013/100636
PCT Pub. Date: Jul. 4, 2013

(65) Prior Publication Data
US 2014/0364095 A1    Dec. 11, 2014

Related U.S. Application Data

(60) Provisional application No. 61/582,063, filed on Dec. 30, 2011.

(51) Int. Cl.
*G06F 15/16*    (2006.01)
*H04L 29/08*    (2006.01)
(Continued)

(52) U.S. Cl.
CPC .......... *H04L 67/2823* (2013.01); *G06F 21/57* (2013.01); *G06F 21/85* (2013.01);
(Continued)

(58) Field of Classification Search
CPC ...... G06F 21/6218; G06F 21/44; G06F 21/57; G06Q 20/352; G06Q 20/325; G06Q 20/20;
(Continued)

(56) References Cited

U.S. PATENT DOCUMENTS 6,005,942 A    12/1999  Chan et al.
8,297,520 B1   10/2012  Wakerly et al.
(Continued)

FOREIGN PATENT DOCUMENTS

CN    1392743    1/2003
CN    101685511  3/2010
(Continued)

OTHER PUBLICATIONS

Office Action for Korean application 10-2012-0154777 dated Jan. 10, 2014.
(Continued)

*Primary Examiner* — Djenane Bayard
(74) *Attorney, Agent, or Firm* — Workman Nydegger (57) ABSTRACT

A master TSM is provided. The master TSM intermediates between entities connected to different TSMs by connecting the TSMs via an interface module which is communicable with a plurality of TSMs. Accordingly, interoperability is possible between entities and clients connected to different TSMs and thus a variety of services can be provided. Therefore, conveniences for all of the entities and clients can be guaranteed from the information processing and service providing aspects.

20 Claims, 6 Drawing Sheets

(51) Int. Cl.
*G06F 21/57* (2013.01)
*G06F 21/85* (2013.01)
*H04L 29/06* (2006.01)

(52) U.S. Cl.
CPC .. *H04L 63/0884* (2013.01); *G06F 2221/2101* (2013.01); *H04L 63/0892* (2013.01); *H04L 69/08* (2013.01)

(58) Field of Classification Search
CPC ............ H04L 63/0853; H04L 63/0428; H04L 2209/80; H04L 63/061; H04L 2463/062; H04L 9/0894; H04L 9/3234; H04L 2463/061; H04L 63/08; H04L 63/126; H04L 9/083
See application file for complete search history.

(56) References Cited

U.S. PATENT DOCUMENTS

| | | | |
|---|---|---|---|
| 8,807,440 B1 * | 8/2014 | von Behren | G06Q 20/367 235/492 |
| 8,843,125 B2 | 9/2014 | Kwon et al. | |
| 8,862,767 B2 | 10/2014 | Taveau et al. | |
| 9,161,218 B2 | 10/2015 | Bae et al. | |
| 2003/0101246 A1 | 5/2003 | Lahti | |
| 2004/0123138 A1 | 6/2004 | Le Saint | |
| 2004/0240671 A1 | 12/2004 | Hu et al. | |
| 2006/0165060 A1 | 7/2006 | Dua | |
| 2006/0173991 A1 | 8/2006 | Pilkivi | |
| 2006/0268835 A1 | 11/2006 | Hyotylainen et al. | |
| 2007/0058645 A1 | 3/2007 | Nannra et al. | |
| 2007/0221725 A1 | 9/2007 | Kawaguchi | |
| 2008/0255947 A1 | 10/2008 | Friedman | |
| 2009/0113525 A1 | 4/2009 | Rajan et al. | |
| 2010/0106967 A1 | 4/2010 | Johansson et al. | |
| 2010/0199089 A1 | 8/2010 | Vysogorets et al. | |
| 2010/0291904 A1 | 11/2010 | Musfeldt et al. | |
| 2010/0306076 A1 | 12/2010 | Taveau et al. | |
| 2010/0323681 A1 * | 12/2010 | Corda | G06Q 20/223 455/419 |
| 2010/0325269 A1 | 12/2010 | Kim et al. | |
| 2011/0047257 A1 | 2/2011 | Lee et al. | |
| 2011/0087610 A1 | 4/2011 | Batada et al. | |
| 2011/0239304 A1 | 9/2011 | Saarisalo | |
| 2011/0276802 A1 | 11/2011 | Roberts et al. | |
| 2011/0296182 A1 | 12/2011 | Jia et al. | |
| 2012/0123935 A1 | 5/2012 | Brudnicki et al. | |
| 2012/0124658 A1 | 5/2012 | Brudnicki et al. | |
| 2012/0143706 A1 | 6/2012 | Crake et al. | |
| 2012/0159105 A1 | 6/2012 | Von Behren et al. | |
| 2012/0172026 A1 | 7/2012 | Kwon et al. | |
| 2012/0172089 A1 | 7/2012 | Bae et al. | |
| 2012/0222136 A1 | 8/2012 | Yamaguchi et al. | |
| 2013/0073848 A1 * | 3/2013 | Pelly | H04L 9/083 713/164 |
| 2013/0109307 A1 | 5/2013 | Reisgies et al. | |
| 2013/0160134 A1 | 6/2013 | Marcovecchio et al. | |
| 2013/0304651 A1 | 11/2013 | Smith | |
| 2014/0273973 A1 | 9/2014 | Jeon et al. | |
| 2014/0344899 A1 | 11/2014 | Kwon et al. | |
| 2015/0031338 A1 | 1/2015 | You | |
| 2015/0310223 A1 * | 10/2015 | Gargiulo | H04L 9/32 726/26 |

FOREIGN PATENT DOCUMENTS

| | | |
|---|---|---|
| EP | 1021801 | 7/2000 |
| EP | 1455499 | 9/2004 |
| EP | 2388968 | 11/2011 |
| EP | 2582062 | 4/2013 |
| EP | 2746981 | 6/2014 |
| FR | 2826212 | 12/2002 |
| JP | 201148761 | 3/2011 |
| JP | 2011508466 | 3/2011 |
| KR | 20030088492 | 11/2003 |
| KR | 20040058595 | 7/2004 |
| KR | 20050050757 | 6/2005 |
| KR | 20050114635 | 12/2005 |
| KR | 20060094736 | 8/2006 |
| KR | 20070011623 | 1/2007 |
| KR | 10-0781136 | 11/2007 |
| KR | 20080088007 | 10/2008 |
| KR | 20100029286 | 3/2010 |
| KR | 20100040049 | 4/2010 |
| KR | 20100040692 | 4/2010 |
| KR | 20110019679 | 2/2011 |
| KR | 10-2011-0035759 A | 4/2011 |
| KR | 20110049649 | 5/2011 |
| KR | 20110061368 | 6/2011 |
| KR | 20110103822 | 9/2011 |
| KR | 20110104480 | 9/2011 |
| KR | 20110120977 | 11/2011 |
| KR | 20120085491 | 8/2012 |
| KR | 101357949 | 1/2014 |
| KR | 101363753 | 1/2014 |
| KR | 101414932 | 6/2014 |
| KR | 101419138 | 7/2014 |
| KR | 101455154 | 10/2014 |
| WO | 2007142566 | 12/2007 |
| WO | 2009/040714 A1 | 4/2009 |
| WO | 2009043859 | 4/2009 |
| WO | 2009103623 | 8/2009 |
| WO | 2011000690 | 1/2011 |
| WO | 2011153688 | 12/2011 |
| WO | 2013058509 | 4/2013 |
| WO | 2013094968 | 6/2013 |
| WO | 2013100419 | 7/2013 |
| WO | 2013100636 | 7/2013 |

OTHER PUBLICATIONS

European Communication Rule 63(1)a for corresponding Application No. 12 863 955.6 dated Jul. 16, 2015.
GEMALTO: R8 CR to 102 412 to include Trusted Service Manager usecase and requirements in Confidential Applications; European Telecommunications Standards Institute (ETSI), 650, Route Des Lucioles ; F-06921 Sophia-Antipolis ; France, vol. SCP, Apr. 4, 2008 (Apr. 4, 2008), pp. 1-2, XP014099410, [retrieved on Apr. 4, 2008].
"3rd Generation Partnership Project; Technical Specification Group Services and System Aspects; Feasibility Study on the Security Aspects of Remote Provisioning and Change of Subscription for Machine to Machine (M2M) Equipment (release9)," 3GPP Draft ; 33812-920, 3rd Generation Partnership Project (3GPP), Mobile Competence Centre; 650, Route Des Lucioles; F-06921 Sophia-Antipolis Cedex; France; Jun. 22, 2010, XP050912534.
"Universal Mobile Telecommunications System (UMTS); Generic Authentication Architecture (GAA); Generic Boostrapping Architecture (3GPP TS 33.220 version 6.3.0 Release 6); ETSI TS 133 220" IEEE, LIS, Sophia Antipolis Cedex, France, vol. 3-SA3, No. V6.3.0, Dec. 1, 2004, XP014028221.
European Search Report for EP12841456 dated Jul. 24, 2015.
European Search Report for EP12858802 dated Jul. 3, 2015.
European Search Report for EP12863824 dated Aug. 3, 2015.
European Search Report for EP12863955 dated Nov. 26, 2015.
International Search Report and Written Opinion for PCT/KR2012/008378 dated Mar. 21, 2013.
International Search Report and Written Opinion for PCT/KR2012/011582 dated Apr. 12, 2013.
International Search Report and Written Opinion for PCT/KR2012/011081 dated Mar. 29, 2013.
International Search Report and Written Opinion PCT/KR2012/010323 dated Feb. 18, 2013.
U.S. Appl. No. 14/369,898, dated Jun. 8, 2015, Office Action.
U.S. Appl. No. 14/352,914, dated Nov. 5, 2015, Office Action.
U.S. Appl. No. 14/369,898, dated Nov. 25, 2015, Final Office Action.
U.S. Appl. No. 14/368,204, dated Feb. 10, 2016, Office Action.

(56) References Cited

OTHER PUBLICATIONS

U.S. Appl. No. 14/352,914, dated Aug. 22, 2016, Final Office Action.
U.S. Appl. No. 14/368,204, dated Aug. 25, 2016, Final Office Action.
Examination Report for application No. 12841456.2 dated Jul. 11, 2016.

* cited by examiner

MASTER TSM

CROSS REFERENCE TO RELATED APPLICATIONS

This application is a National Stage of International Application No. PCT/KR2012/011582, filed on Dec. 27, 2012, which claims priority from U.S. Provisional Patent Application No. 61/582,063, filed on Dec. 30, 2011, the contents of all of which are incorporated herein by reference in their entirety.

TECHNICAL FIELD

The present invention relates to a centralized Trusted Service Manager (TSM) for managing a plurality of TSMs in a mobile commerce ecosystem.

BACKGROUND ART

Conventionally, a mobile commerce service may be conducted through partnership among various service providers (SPs), such as financial institutions, transportation companies, and Mobile Network Operators (MNOs) to provide various services to the general public.

However, partnerships formed among various SPs and MNOs may be limited due to inherent conflicting business interests among entities that are involved. For example, a specific SP such as MasterCard® may not want to share sensitive information related to one of its clients to a competing SP like Visa®.

In addition, there may be some technical incompatibilities, which may limit partnerships among the various entities that are involved. Due to this incompatibilities, user may have several accounts for various SPs on the user's mobile terminal. In addition, a user may be unable to access certain SPs, if the mobile communication network that user is subscribed to does not support interconnection with other SPs.

Figure 1:
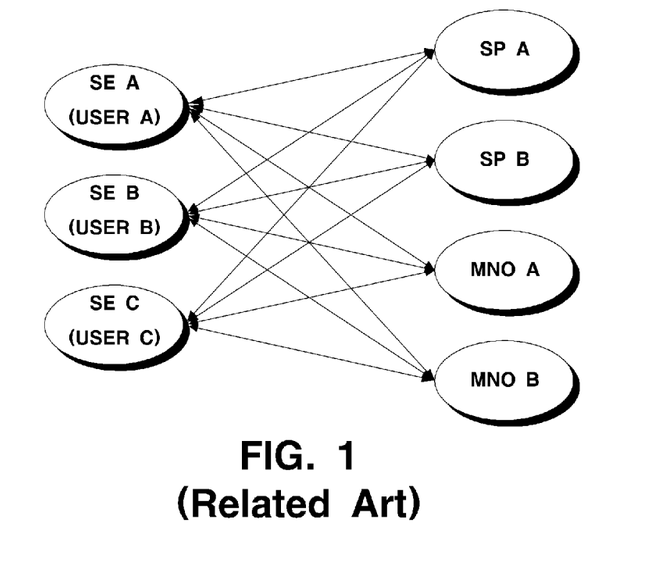
FIG. 1 is a view illustrating a conventional relationship between various entities in a mobile communication network.

FIG. 1 is a view illustrating a conventional relationship between various entities in a mobile communication network.

As shown in FIG. 1, a plurality of users or customers with mobile terminals equipped with Secure Element (SE) may interact with a single or multiple SPs and/or MNOs. Since a user or a customer may interact with SPs and/or MNOs directly, an account may be created for each SP and/or MNO. However, as entities may desire not to share confidential information with other entities in the mobile communication network, a single unified account or point of contact to facilitate transactions with the illustrated entities may be difficult to achieve.

In addition, since certain mobile terminals or SEs such as Subscriber Identity Module (SIM), Universal Subscriber Identity Module (USIM), embedded SE, and other forms of SEs may not support operations of selecting SPs and/or MNOs, interoperability may be limited.

DISCLOSURE

Technical Problem

An aspect of the present invention is to solve at least the above-mentioned problems and/or disadvantages and to provide at least the advantages described below. Accordingly, an aspect of the present invention is to provide a system and method for facilitating mobile commerce services.

Another aspect of the present invention is to provide a master TSM and a method for TSM intermediation for ensuring interoperability among entities connected to different TSMs and SEs.

Technical Solution

According to an aspect of an exemplary embodiment, there is provided a master Trusted Service Manager (TSM) including: a TSM interface to communicate with a plurality of TSMs; a management module to facilitate transmission and receiving of data with the plurality of TSMs; a reporting module to report transactions between the TSMs; a security module to monitor transactions between the TSMs; and a monitoring module to keep track of transactions between the TSMs. According to an aspect of another exemplary embodiment, there is provided a method for facilitating transaction among plurality of TSMs including: receiving a request to receive information from a first TSM by a second TSM; determining whether the second TSM has access right to receive information from the first TSM; determining routing information of the first TSM; transmitting the request for information from the second TSM to the first TSM through a neutral server; and receiving the requested information from the first TSM by the second TSM.

According to an aspect of another exemplary embodiment, there is provided a master TSM including: an interface module configured to communicate with a plurality of TSMs; and a management module configured to connect a first TSM and a second TSM to each other via the interface module, and intermediate between a first entity connected to the first TSM and a second entity connected to the second TSM, wherein the first TSM is not able to directly access the second entity of the second TSM without passing through the management module, and wherein the second TSM is not able to directly access the first entity of the first TSM without passing through the management module.

The first TSM and the second TSM may be owned and operated by different entities.

The first TSM and the second TSM may use different data formats, and the management module may match the data format used by the first TSM with the data format used by the second TSM.

The management module may intermediate between the first TSM connected to the first entity and the second TSM connected to the second entity by connecting the first TSM and the second TSM to each other via the interface module by storing and referring to information on the TSMs and information on entities connected to each TSM.

The management module may not transmit information on the second TSM to the first TSM, and may not transmit information on the first TSM to the second TSM.

The master TSM may operate as the second entity for the first entity, and may operate as the first entity for the second entity.

When a new TSM is additionally able to communicate, the management module may acquire information on the new TSM and information on main entities connected to the TSM.

The management module may intermediate between the first entity connected to the first TSM and a third entity connected to a third TSM by connecting the first TSM and the third TSM to each other via the interface module, and the management module may not intermediate between the second entity connected to the second TSM and the third entity connected to the third TSM, without connecting the second TSM and the third TSM to each other via the interface module.

The management module may relay some service between the first entity connected to the first TSM and the second entity connected to the second TSM, and may not relay the other services.

The first TSM may not be able to directly access a fourth entity connected to a fourth TSM via the fourth TSM without passing through the management module.

The master TSM may further include a reporting module configured to report on intermediation-related information and intermediation refusal-related information between the first entity connected to the first TSM and the second entity connected to the second TSM.

According to an aspect of another exemplary embodiment, there is provided a method for intermediating between TSMs, the method including: connecting a first TSM and a second TSM to each other via an interface module which is able to communicate with a plurality of TSMs; and intermediating between a first entity connected to the first TSM and a second entity connected to the second TSM, wherein the first TSM is not able to directly access the second entity of the second TSM without the intermediation, and wherein the second TSM is not able to directly access the first entity of the first TSM without the intermediation.

Advantageous Effects

As described above, according to various exemplary embodiments, interoperability is achieved among entities and clients connected to different TSMs, thus a wide array of services can be provided, ensuring conveniences of the information processing and service rendering.

DESCRIPTION OF DRAWINGS

The accompanying drawings, which are included to provide a further understanding of the invention and are incorporated in and constitute a part of this specification, illustrate embodiments of the invention, and together with the description serve to explain the principles of the invention.

BEST MODE

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Figure 2:
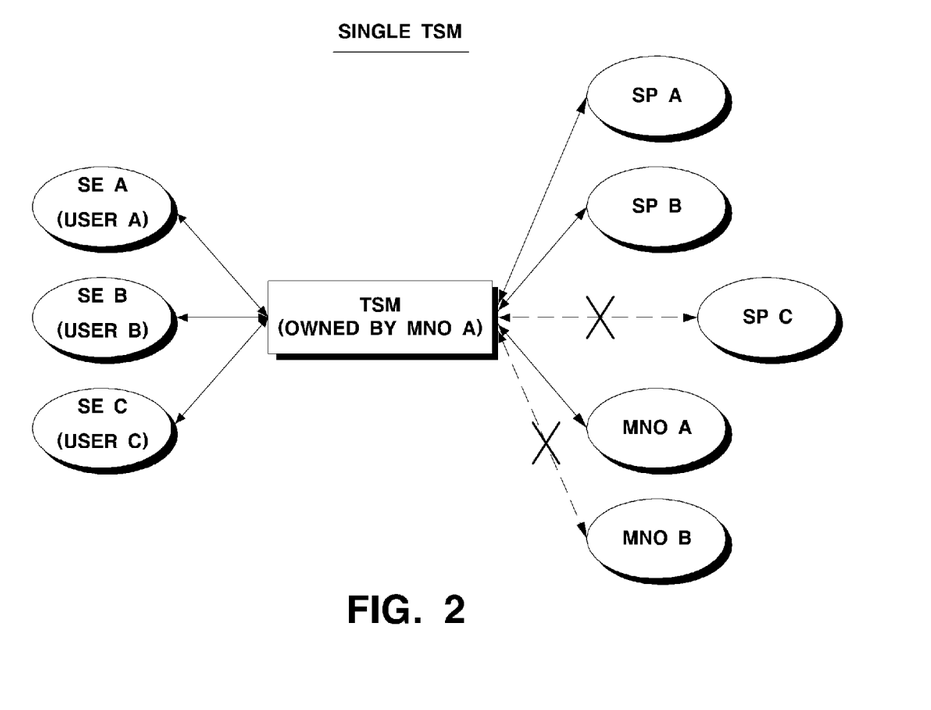
FIG. 2 is a relationship diagram illustrating a mobile payment relationship between various stakeholders using a TSM.

FIG. 2 is a relationship diagram illustrating a mobile payment relationship between various stakeholders using a TSM.

A Trusted Service Manager (TSM), as a intermediary, may be used to alleviate some of these conflicts among stakeholders and to support a mobile commerce service system. More specifically, by providing a intermediary to facilitate various transactions between the MNOs and/or SPs, a user or a customer may manage interactions with a plurality of SPs and/or MNOs with a single account through the TSM.

However, TSMs may also have some limitations in that various stakeholders (e.g., MNOs, SPs, financial institutions, and/or payment processors) are vying for ownership of TSM technology and developing their own respective TSM systems. Accordingly, formats between various TSMs may be different and the owners of the respective TSM technology may still deny or limit support to competing entities.

Referring to FIG. 2, one or more users, by using their respective mobile terminals, may interact with SP A, SP B, and MNO A through a TSM. Since interactions between various entities may be facilitated by the TSM, a single account tying various services may be possible. However, as mentioned above, because TSMs themselves may be owned by one of the entities involved in the interaction, which may operate for its own benefit, interoperability may be limited.

As shown in FIG. 2, the TSM, which is owned by MNO A, may refuse to support services to SP C or MNO B due to various business conflicts or technical incompatibility. In addition, even if the respective TSMs were to offer services to SP C, the SP C may opt to build its own TSM rather than leveraging one owned by a competitor to avoid paying licensing fees or capture more of the profits by itself. Accordingly, interoperability between various entities in the mobile communication network may still be limited.

Figure 3:
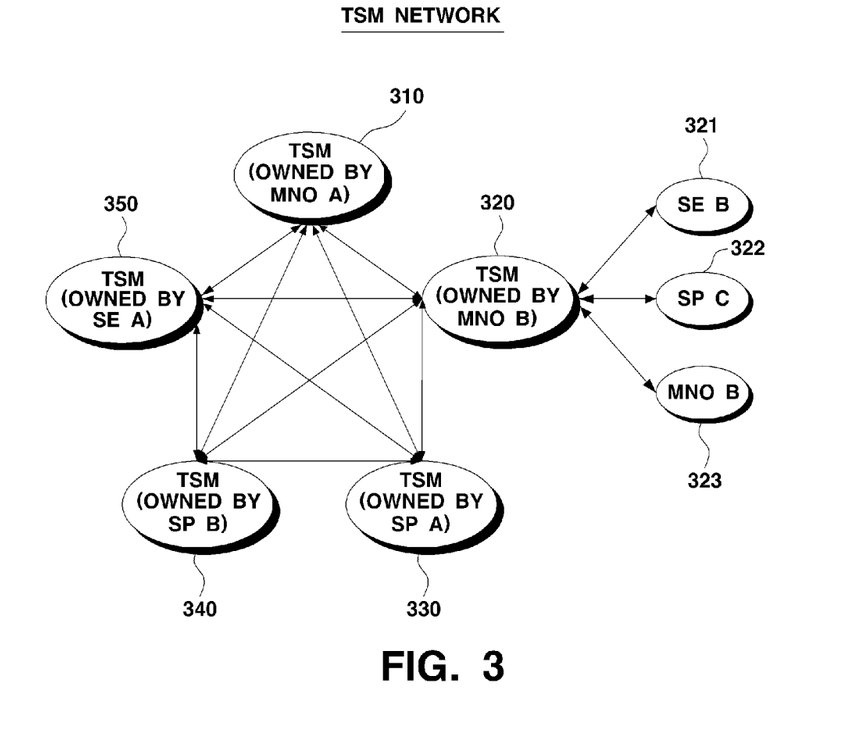
FIG. 3 is a relationship diagram illustrating a TSM network according to an exemplary embodiment of the present invention.

FIG. 3 is a relationship diagram illustrating a TSM network according to an exemplary embodiment of the present invention.

Referring to FIG. 3, the TSM network may alleviate some of the limitations found in having a single TSM system in a network. As shown in FIG. 3, a TSM 310 is owned by MNO A, a TSM 320 is owned by MNO B, a TSM 330 is owned by SP A, a TSM 340 is owned by SP B, and a TSM 350 is owned by SE A.

By creating a network of TSMs owned by various stakeholders, a SP that may typically not be supported by one TSM, may be supported through another TSM. For example, when MNO A, which may be connected to the TSM 310, wants to interact with SP B, which may be connected to the TSM 340, the TSM 310 may transmit and receive data to and from the TSM 340 to provide interoperability. Accordingly, some of the limitations in interoperability may be removed.

To facilitate transactions between various entities, more specifically, transmitting and receiving information to and from a user's SE equipped in a mobile terminal, a secure key allowing access to the respective SEs may be utilized. In addition, other entities may provide a secure access key to its systems to facilitate transactions with other entities connected to the same TSM.

For example, when the TSM 320 has access to secure keys to SE B 321, SP C 322, and MNO B 323, the TSM 320 may access and/or receive information from the respective entities. Accordingly, the TSM 320 may provide information of the respective entities connected to the TSM 320 to the requesting entity, which may be connected to the TSM 320 (e.g., when SP C 322 requests information of SE B 321 or MNO B 323 to facilitate transaction).

However, since the secure key allowing access to the SEs may provide sensitive data of the user, the individual entities or the corresponding TSM, which may have access to such information, may be hesitant in providing such information to other TSMs or entities requesting access to such information. For example, the TSM 320 or SE B 321 may be hesitant in having secure information of SE B 321 released to TSM 340 or an entity connected to TSM 340.

Since the illustrated TSMs may be owned by different entities that may have incompatible or conflicting interests, some of the TSMs may opt out of the TSM network or selectively refuse to interact with one or more entities belonging to the TSM network. Referring to the above example, since the TSM 310 is owned by MNO A, which may be competing with MNO B, the TSM 310 may refuse to interact with the TSM 320. Accordingly, a intermediary to facilitate transactions between incompatible or conflicting entities may be desired.

Figure 4:
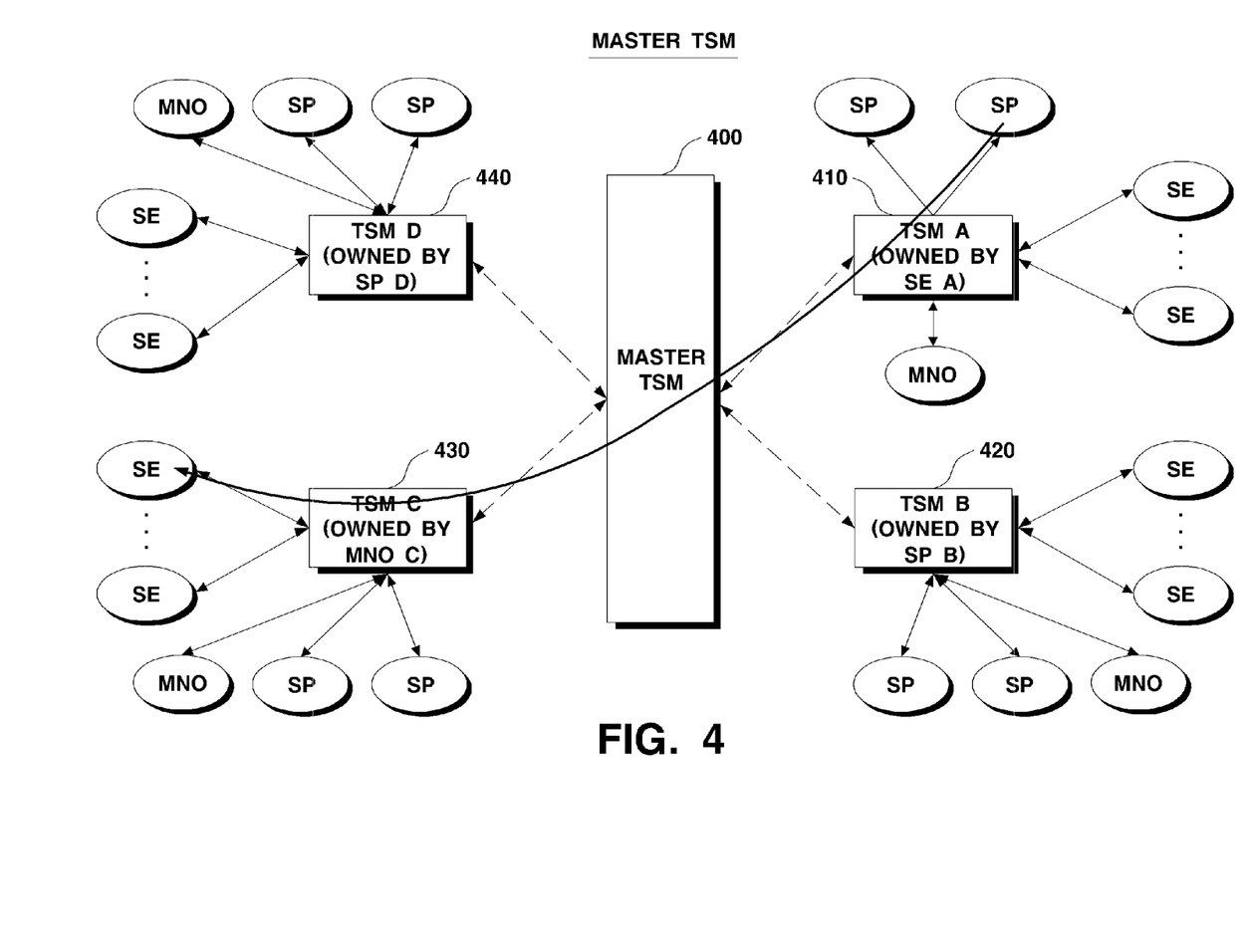
FIG. 4 is a relationship diagram illustrating a TSM network facilitated by a master TSM according to an exemplary embodiment of the present invention.

FIG. 4 is a relationship diagram illustrating a TSM network facilitated by a master TSM according to an exemplary embodiment of the present invention.

Referring to FIG. 4, a master TSM 400 is provided to facilitate transactions between multiple TSMs owned by different entities, including a TSM A 410, a TSM B 420, a TSM C 430, and a TSM D 440.

The TSM A 410 is owned by SE A, the TSM B 420 is owned by SP B, the TSM C 430 is owned by MNO C, and the TSM D 440 is owned by SP D. In addition, while it is not illustrated, the master TSM 400 may also facilitate transactions with stand-alone servers, third entity servers, and/or other entities as well and is not limited to transactions with TSMs.

Since SE A may have access to a secure key of SEs issued by SE A, the TSM A 410 may cater to SEs provided by SE A while restricting access to SEs provided by SE B, SE C, and/or SE D. With the secure key corresponding to the SEs provided by SE A, the TSM A 410 may provision data into the respective SEs to facilitate various transactions using the provisioned data. Accordingly, SPs connected to TSM A 410 may be limited to catering to users who own SEs provided by SE A.

The master TSM 400 may be a neutral entity that may route connections between various TSMs. The master TSM 400 may store various information related to the connected TSMs to facilitate transactions between entities that may be connected to separate TSMs. In an example, the master TSM 400 may manage, without limitation, its relationship with other TSMs, life cycle (LC) of SEs included in the TSM network, data format information of various TSMs, routing information to connect the master TSM 400 to other TSMs in the TSM network, and various secure keys that may be used to conduct transactions.

In addition, the TSM A 410 may share secure keys for its customers' SEs and other connected entities (e.g., SP, MNO) individually with the master TSM 400 to facilitate transactions between other entities that are not connected to the TSM A 410.

Also, the TSM A 410 may share a secure key with the master TSM 400 to access the TSM A 410, without providing secure keys of its customers' SEs or its connected entities.

Accordingly, the TSM A 410 may facilitate transactions with or without providing confidential information of the respective entities/clients (e.g., SP, MNO, SE) to other TSMs owned by other entities.

In addition, since various TSMs may be owned and operated by different entities, the data formats may be different. Accordingly, the master TSM 400 may also provide an interface to convert various data formats as well as to prepare and provide additional data.

When a new TSM is added to the TSM network to which the master TSM 400 is connected, information relevant to the new TSM may be added for storage in the master TSM 400. At least one of information related to network addresses, secure access key(s), information of various connected entities/clients (e.g., SP, SE, MNO), and other information may be provided to the master TSM 400. The master TSM 400 in response may update its relationship information and/or routing information with various TSMS to include the TSM in the new TSM network.

Accordingly, various entities may interact with other entities/clients without regard to ownership of the TSM. As shown in FIG. 4, an SP that is connected to the TSM 410 owned by SE A may interact with a different SE, which is connected to the TSM C 430 owned by MNO C. Since various entities/clients are able to interact with each other without regard to ownership and interests of the TSM, interoperability may more readily be achieved.

Figure 5:
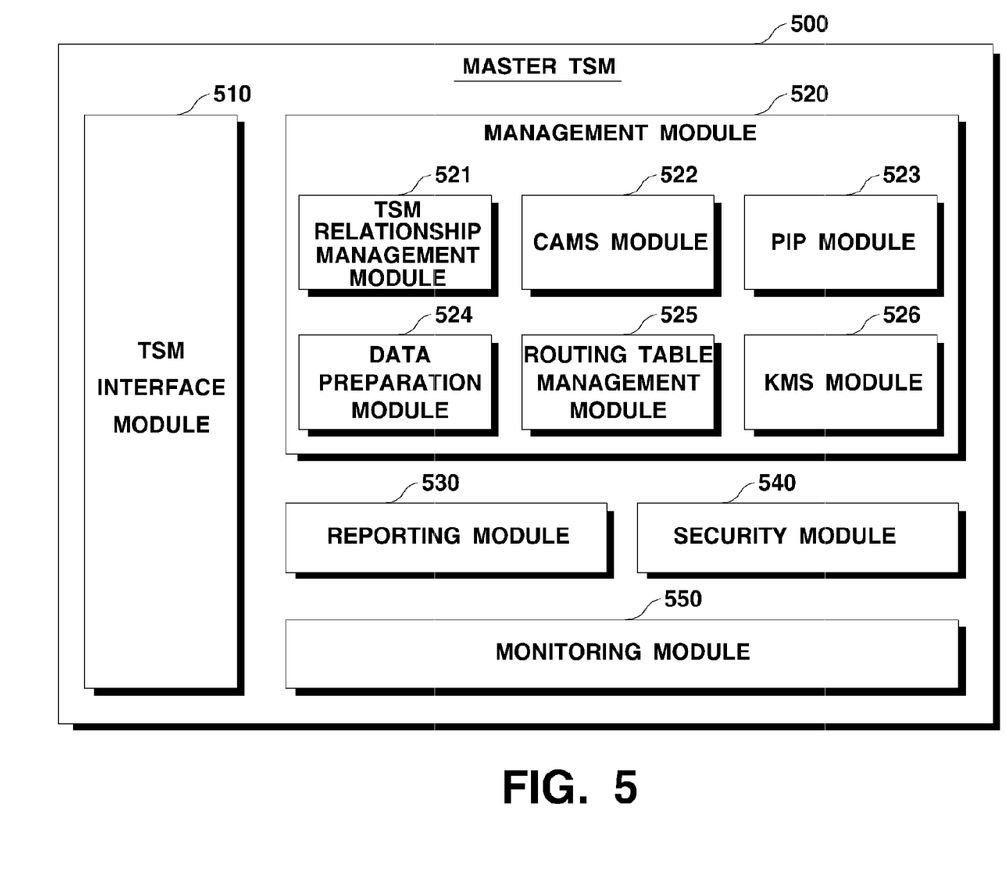
FIG. 5 is a block diagram illustrating a master TSM according to an exemplary embodiment of the present invention.

FIG. 5 is a block diagram illustrating a master TSM according to an exemplary embodiment of the present invention.

Referring to FIG. 5, a master TSM 500 includes a TSM interface module 510, a management module 520, a reporting module 530, a security module 540, and a monitoring module 550. The management module 520 includes a TSM relationship management module 521, a Card & Application Management System (CAMS) module 522, a Post Issuance Processor (PIP) module 523, a data preparation module 524, a routing table management module 525, and a Key Management System (KMS) module 526.

The TSM interface module 510 may provide an interface for external entities to send/receive data of the master TSM 500. The external entities may include, without limitation, TSMs connected to the master TSM 500. Since one or more of the connected TSMs may be owned by different entities, which use different protocols, the TSM interface 510 is required to translate commands and requests which are received at the master TSM 500 or transmitted by the master TSM 500.

The management module 520 manages various aspects of TSMs that are connected to the master TSM 500. The management module 520 may manage relationships with other TSMs that are connected to the master TSM 500, life cycle (LC) of SEs included in the TSM network, data format information of various TSMs, routing information to connect the master the TSM 500 to connected TSMs, and various secure keys that may be used to conduct transactions.

More specifically, the TSM relationship management module 521 of the management module 520 may manage relationships between various TSMs. Specifically, the TSM relationship management module 521 may store TSM connection information of SP, MNO, SE or other entities. Accordingly, the master TSM 500 may store information on various entities/clients (e.g., SP, MNO, SE, and other entities/clients) connected to each TSM in the TSM network. In addition, the TSM relationship management module 521 may also store ownership information of the respective TSMs.

The CAMS module 522 may be responsible for managing an LC of an SE, secure domains, and applets. The LC refers to a status of each of the mobile terminal, electronic device, or application. In an example, the LC of the SE may include Operating System (OS) native, initialization, and secure status information. The LC of the applet may include lock and unlock. The CAMS module 522 manages SE type, SE profile, SE identification (ID), application profile, and card profile. The SE has its own SE ID (e.g., Card Reference Number (CRN), Card Image Number (CIN), Card Production Life Cycle (CPLC), and/or Card Serial Number (CSN)), and is individually identified and controlled by the CAMS module 522.

The PIP module 523 provisions information into the mobile terminal by preparing data and sending and receiving messages recorded in Application Protocol Data Units (APDU). The APDU may refer to a communication means between a reader and a card.

The data preparation module 524 may prepares data in an appropriate format to match various TSMs. More specifically, the data preparation module 524 may determine a data format and a receiving TSM, and compares the data format and the receiving TSM to determine whether data transmission between various entities is compatible. As various entities and TSMs may have different specifications in preparing data, some data may require more data preparation than others. In an example, data provided by the SP may be provided in three different formats: APDU format, Data Grouping Identifier (DGI) format, and raw data format.

When it is determined that the SP provides the data in an APDU format, the data preparation module 524 may not perform any additional processing before transmitting the data to the receiving TSM. When it is determined that only the logical data preparation has been performed, the data preparation module 524 may classify the data as a DGI format and begin physical data preparation to convert the DGI data into the APDU format. Physical data preparation may be executed using one or more suitable methods available. Lastly, when it is determined that the SP did not prepare the data at all and only the raw data is provided, the data preparation module 524 may first conduct logical data preparation and then physical data preparation may be performed.

The routing table management module 525 may store and manage routing information on various TSMs connected to the master TSM 500. The routing table management module 525 may store the routing information in a table. In an example, the routing information may include, without limitation, at least one of a network address, port address, a secure access key, and other information. Accordingly, entities connected to different TSMs may be routed successfully through the master TSM 500.

The KMS module 526 manages all of the keys for allowing secure transactions. Key management may include secure log in, access control, audit, key profile management, key management, key profile exchange and recovery, and delegated management.

The reporting module 530 may report on the requested transactions, executed transactions, and/or denied transactions. More specifically, the reporting module 530 may report on at least one of the information on the requesting TSM, requesting entity, time information requested, target TSM, target entity, reason for access or denial, information delivered, and other information.

The security module 540 may monitor requests for access to reduce a possibility of fraudulent or unauthorized access by third entities. More specifically, the security module 540 may monitor and determine validity of the request by a requesting entity by referencing its network address, routing address, a secure access key, and other information. The requesting entity may be a TSM connected to the master TSM 500, or an entity accessing the connected TSM. In an example, when a request is received from an unrecognized network address or an unknown secure access key, the security module 540 may log the attempted access and related information of that request and deny access by the requesting entity.

The monitoring unit 550 may monitor requests for access by various entities, including the connected TSMs and/or various entities connected to the master TSM 500.

Figure 6:
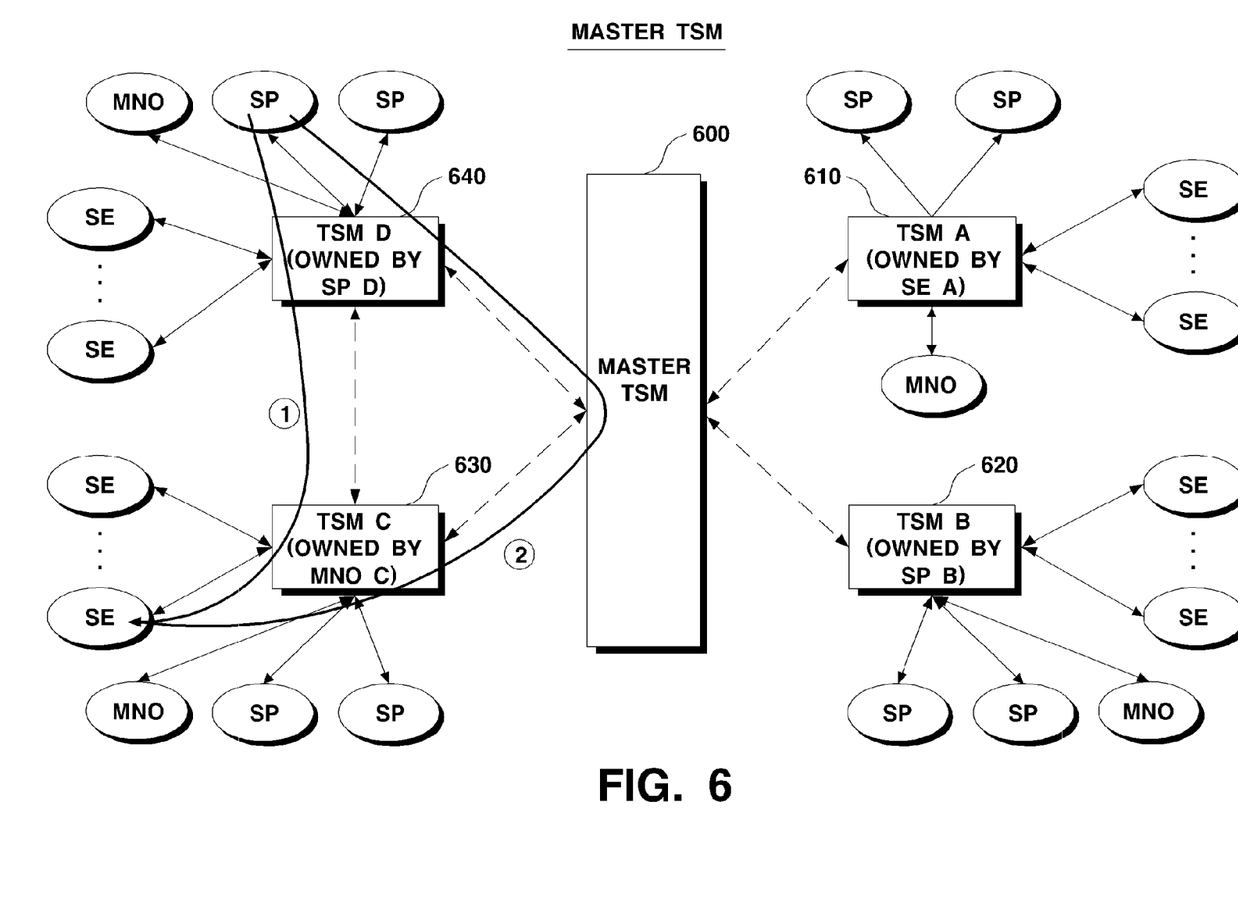
FIG. 6 is a relationship diagram illustrating a TSM network facilitated by a master TSM according to an exemplary embodiment of the present invention.

FIG. 6 is a relationship diagram illustrating a TSM network facilitated by a master TSM according to an exemplary embodiment of the present invention.

The TSM network shown in FIG. 6 is the same as the TSM network shown in FIG. 4 in that a master TSM 600 intermediates among TSMs 610, 620, 630, and 640. However, the TSM network of FIG. 6 is different from the TSM network of FIG. 4 in that the TSM C 630 and the TSM D 640 may directly be connected to each other without passing through the master TSM 600.

Accordingly, the entities/clients of the TSM C 630 and the entities/clients of the TSM D 640 are capable of interoperability not only via a ① path but also via the master TSM 600 according to a ② path.

In this case, the ① path may be used for services requiring high level security such as a financial service, and the ② path may be used for services less sensitive to security such as a value added service.

The master TSM according to various exemplary embodiments has been described up to now.

In the above-described exemplary embodiment, the master TSM connects the TSMs to one another via itself, thereby intermediating between the entities/clients connected to a TSM and the entities/clients connected to other TSMs and thus allowing transactions, service issuance, and data communication.

According to the above-described exemplary embodiments, via the master TSM, an entity is able to access clients that are not connected to it and are connected to other TSMs, and thus are inaccessible directly. In addition, via the master TSM, an entity is able to access entities that are not connected to it and are connected to other TSMs, and thus are inaccessible directly.

In addition, when data formats used in the TSMs are different, the master TSM matches the data formats with one another by converting the data formats.

Strictly speaking, the entity refers to a server or a terminal of the entity and the client refers to a terminal of the client or an SE inserted/embedded in the terminal. Hereinafter, the entity and the client may be referred to as "entity"

When intermediating between the TSMs, the master TSM may transmit only information on the main entities without transmitting TSM information to other TSMs. In this case, the master TSM may operate as a transaction counterpart entity for the entity. For example, in the case of interoperability between the entity and the client, the master TSM operates as a client for the entity and operates as an entity for the client.

The master TSM does not intermediate for all of the TSMs and may restrict some path. For example, the master TSM may not support intermediation between a entity connected to a TSM B and a entity connected to a TSM C by removing mutual connection between the TSM B and the TSM C. This is preferable when the owner of the TSM B and the owner of the TSM C do not want intermediation therebetween due to competition and interest, but the intermediation may be excluded for other reasons.

In addition, the master TSM may limit intermediation partially according to service types, even when the master TSM intermediates between TSMs. For example, the master TSM principally supports intermediation between the TSM A and the TSM B, but may not intermediate for financial services requiring high level security and may intermediate for services less sensitive to security such as value added services.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A mobile terminal having a master Trusted Service Manager (TSM), the master TSM comprising:
   an interface module configured to communicate with a plurality of TSMs; and a management module configured to connect a first TSM and a second TSM to each other via the interface module, and to intermediate between a first entity connected to the first TSM and a second entity connected to the second TSM; and
   a Post Issuance Processor (PIP) module operable to provision information into the mobile terminal by transmitting and receiving messages contained in Application Protocol Data Units (APDUs),
   wherein the first TSM is not able to directly access the second entity of the second TSM without passing through the management module,
   wherein the second TSM is not able to directly access the first entity of the first TSM without passing through the management module; and
   wherein the first TSM provides one or more shared keys to the management module, the shared keys allowing the second entity connected to the second TSM access the shared keys through the management module to conduct one or more transactions with the first entity without being connected to the first TSM.

2. The mobile terminal of claim 1, wherein the first TSM and the second TSM are owned and operated by different entities.

3. The mobile terminal of claim 1, wherein the first TSM and the second TSM use different data formats, and
   wherein the management module converts the data format used by the first TSM to the data format used by the second TSM, allowing the first TSM to communicate with the second TSM.

4. The mobile terminal of claim 1, wherein the management module intermediates between the first TSM connected to the first entity and the second TSM connected to the second entity by connecting the first TSM and the second TSM to each other via the interface module by storing and referring to information on the TSMs and information on entities connected to each TSM.

5. The mobile terminal of claim 4, wherein the management module does not transmit information on the second TSM to the first TSM, and does not transmit information on the first TSM to the second TSM.

6. The mobile terminal of claim 5, wherein the master TSM operates as the second entity for the first entity, and operates as the first entity for the second entity.

7. The mobile terminal of claim 4, wherein, when a new TSM is additionally able to communicate, the management module acquires information on the new TSM and information on main entities connected to the TSM.

8. The mobile terminal of claim 1, wherein the management module intermediate between the first entity connected to the first TSM and a third entity connected to a third TSM by connecting the first TSM and the third TSM to each other via the interface module, and wherein the management module may not intermediate between the second entity connected to the second TSM and the third entity connected to the third TSM, without connecting the second TSM and the third TSM to each other via the interface module.

9. The mobile terminal of claim 1, wherein the management module relays a certain number of services between the first entity connected to the first TSM and the second entity connected to the second TSM, and does not relay rest of remaining services.

10. The mobile terminal of claim 1, wherein the first TSM is able to directly access a fourth entity connected to a fourth TSM via the fourth TSM without passing through the management module.

11. The mobile terminal of claim 1, further comprising a reporting module configured to report on intermediation-related information and intermediation refusal-related information between the first entity connected to the first TSM and the second entity connected to the second TSM.

12. The mobile terminal of claim 1, further comprising a route management module including a routing table operable to store route information for each TSM, the route information including one or more of a network address, port address, or security access key.

13. The mobile terminal of claim 1, further comprising a data preparation module operable to determine whether a data format for sending to a receiving TSM is compatible for the receiving TSM.

14. The mobile terminal of claim 13, wherein the data formats are one of ADPU format, Data Grouping Identifier (DGI) format, or raw data format.

15. The mobile terminal of claim 1, wherein the interface module is further configured to communicate with one or more connected entities, the connected entities including the TSMs, service providers, Mobile Network Operators (MNOs), or secure elements, and further comprising a relationship management module operable to store connection information of each TSM, service provider, MNO, and secure element.

16. A computer-implemented method for intermediating between connected entities within a mobile communication network, the method comprising:
   connecting a first TSM and a second TSM to each other via an interface module which is able to communicate with a plurality of TSMs;
   intermediating, via a management module, between a first entity connected to the first TSM and a second entity connected to the second TSM; and
   storing, in a routing table, route information for each entity the route information for each entity includes one or more of a network address, port address, or security access key,
   wherein the first TSM is not able to directly access the second entity of the second TSM without the intermediating, wherein the second TSM is not able to directly access the first entity of the first TSM without the intermediating; and wherein the first TSM provides one or more shared keys to the management module, the shared keys allowing the second entity connected to the second TSM access the shared keys through the management module to conduct one or more transactions with the first entity without being connected to the first TSM.

17. The method of claim 16, wherein the connected entities include one or more service providers, Mobile Network Operators (MNOs), or secure elements.

18. The method of claim 16, further comprising determining a data format and determining whether data transfer is compatible between separate TSMs based on the determined data format.

19. The method of claim 18, further comprising determining a data format in accordance with format requirements of a receiving entity.

20. The method of claim 19, wherein the data formats are one of ADPU format, Data Grouping Identifier (DGI) format, or raw data format.

* * * * *